April 16, 1957   H. H. WILKEY ET AL   2,788,725
SOIL TILLING MACHINE
Filed June 22, 1953   3 Sheets-Sheet 1
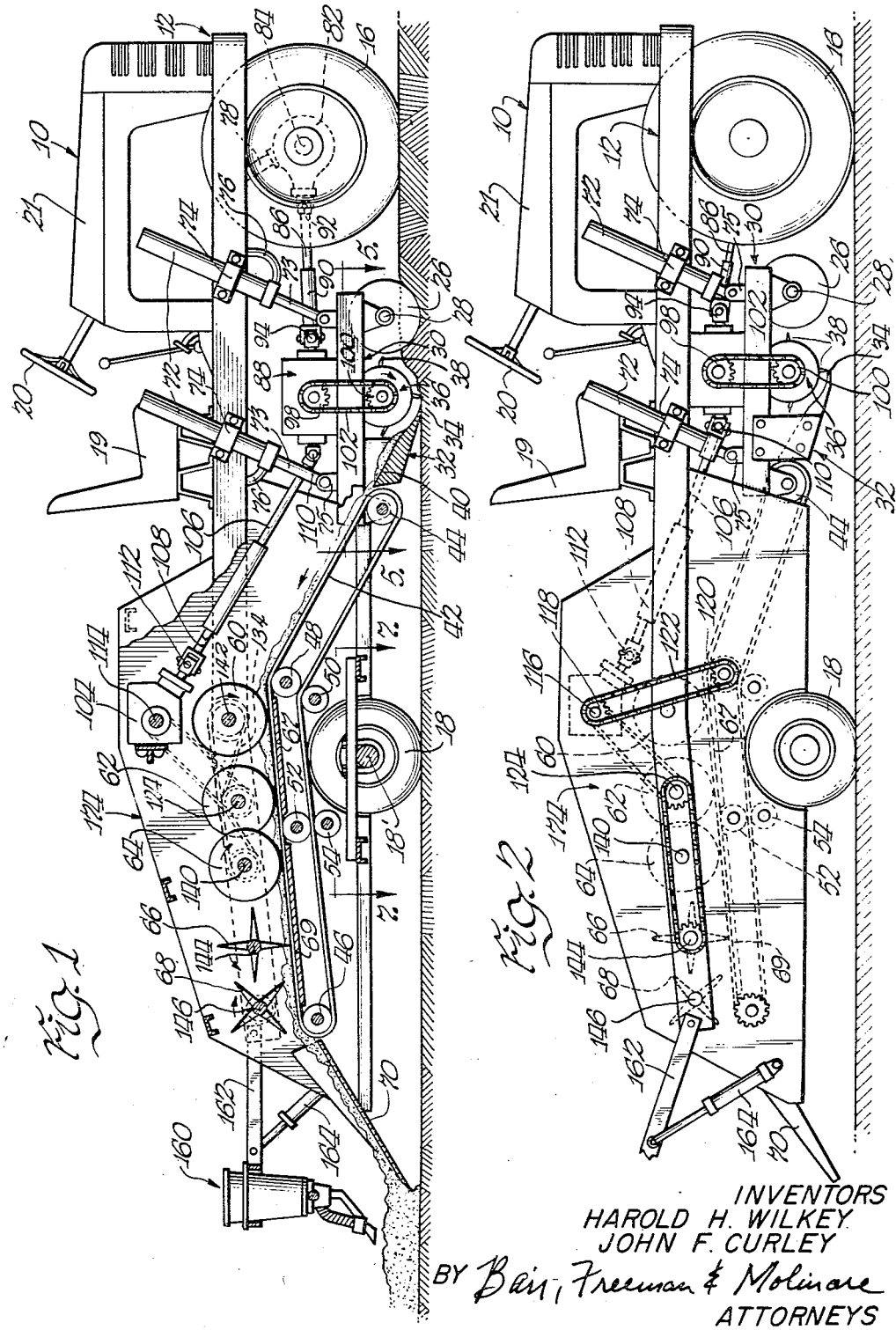
INVENTORS
HAROLD H. WILKEY
JOHN F. CURLEY
BY Bair, Freeman & Molinare
ATTORNEYS April 16, 1957 H. H. WILKEY ET AL 2,788,725
SOIL TILLING MACHINE
Filed June 22, 1953 3 Sheets-Sheet 2
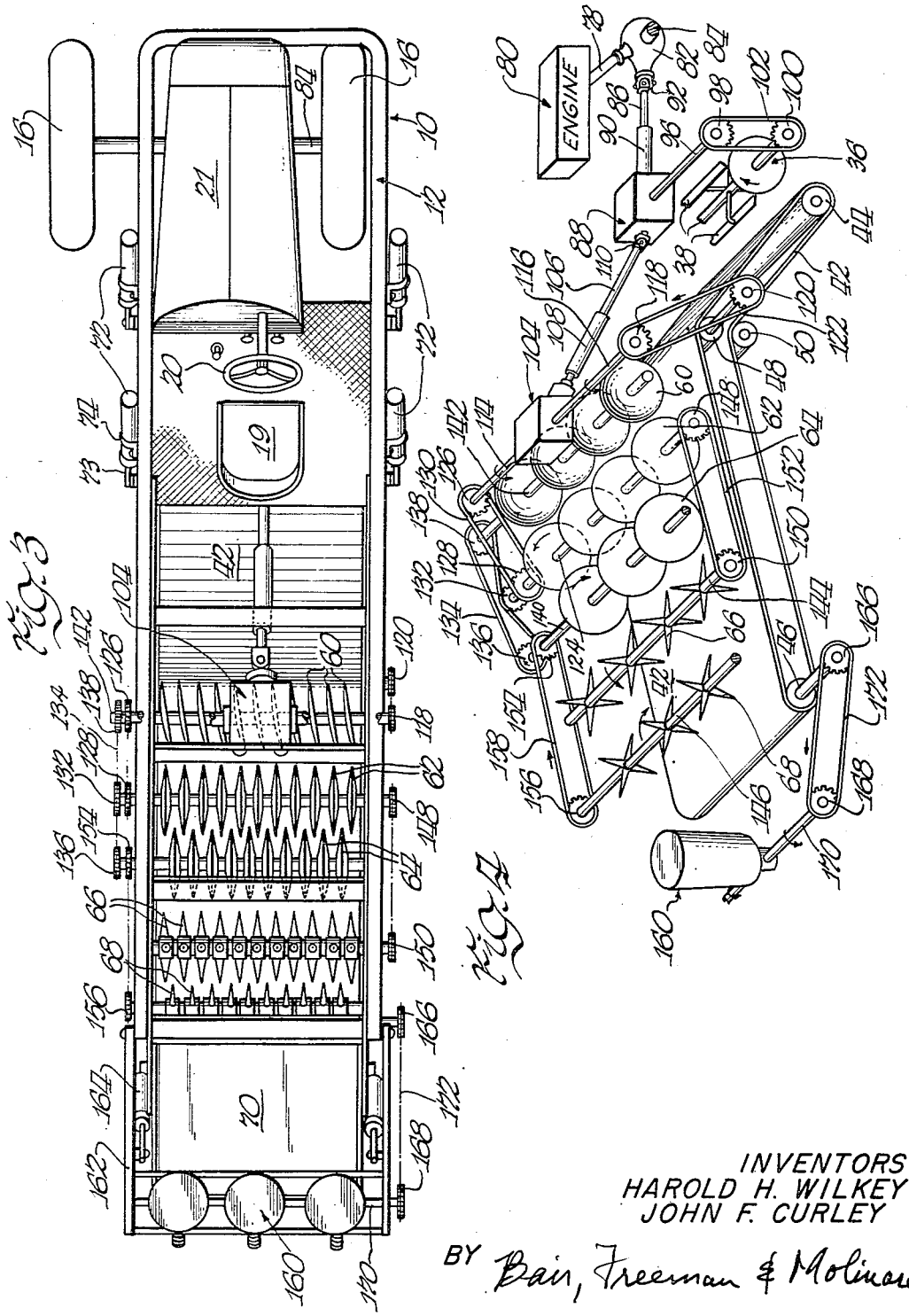
INVENTORS
HAROLD H. WILKEY
JOHN F. CURLEY
BY Bair, Freeman & Molinare
ATTORNEYS

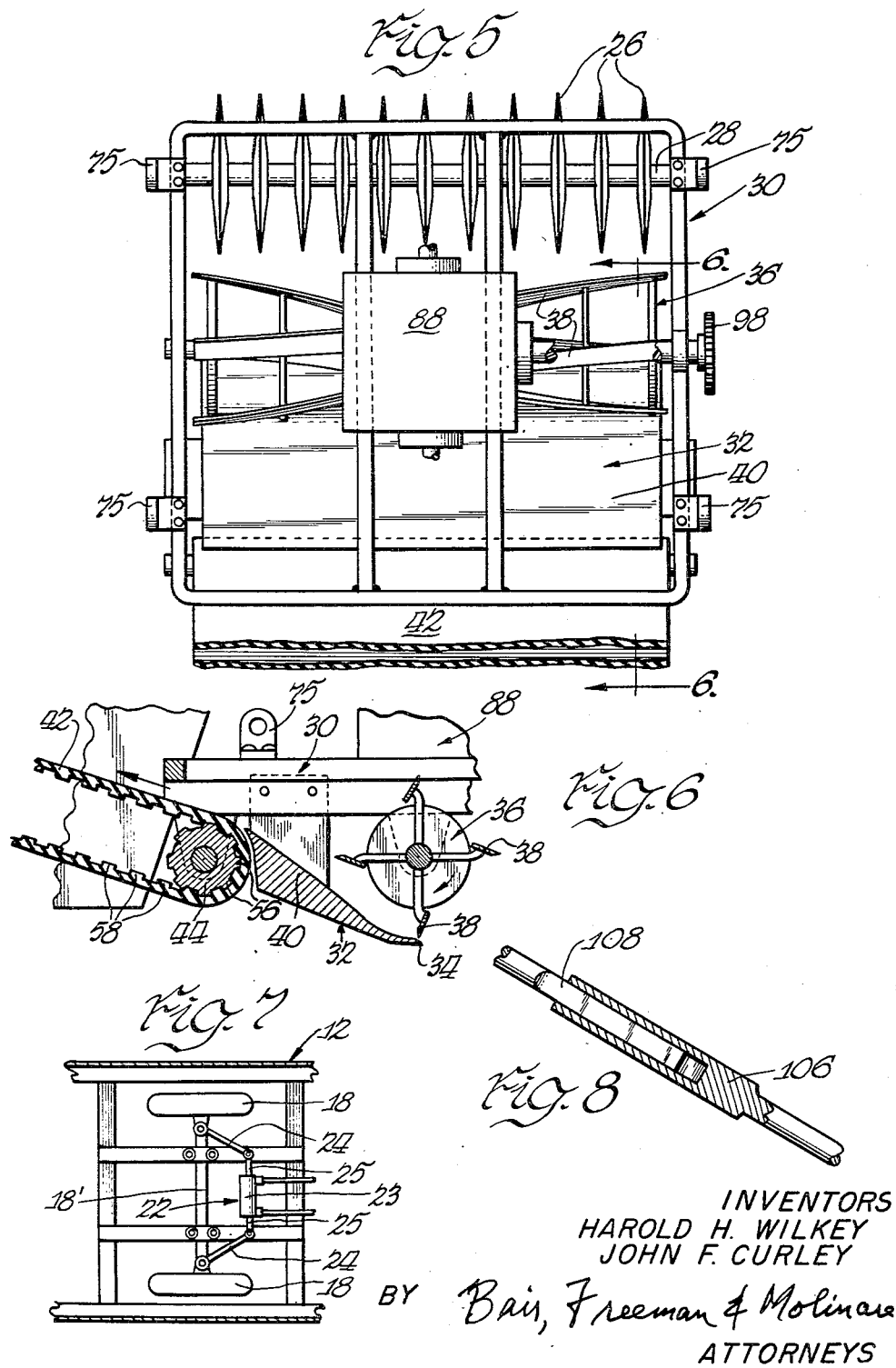

United States Patent Office 2,788,725
Patented Apr. 16, 1957

2,788,725

SOIL TILLING MACHINE

Harold H. Wilkey and John F. Curley, Burlington, Iowa, assignors of fifty-two percent to said Wilkey, twenty-four percent to said Curley, and twenty-four percent to Joseph M. Naifeh, Burlington, Iowa Application June 22, 1953, Serial No. 362,984

7 Claims. (Cl. 97—10)

This invention relates to soil tilling machines and more particularly to a machine for performing in sequence a plurality of tilling operations on the soil as the machine passes over the ground to be tilled.

One of the objects of this invention is to provide a machine for performing a combination of tilling operations on soil in a novel and improved manner.

Another object of this invention is to provide a machine which, in sequence, cuts a layer of top soil into longitudinal strips, severs the layer of longitudinal strips from the ground, cuts the longitudinal strips into segments, and, thereafter, shreads the segments of soil.

A further object of this invention is to provide a machine for performing a sequence of tilling operations on soil as the machine moves over the ground being tilled, which machine elevates the soil to be tilled off the ground, then tills the soil, and thereafter deposits the tilled soil substantially at the same point on the ground from which it was taken.

Still another object of this invention is to provide a self-contained and self-propelled machine for performing, in sequence, a plurality of tilling operations upon soil.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a side elevation view showing the soil tilling machine of this invention with the soil cutting and severing mechanism lowered;

Figure 2 is another side elevation view similar in some respects to Figure 1 and showing the soil cutting and severing mechanism in raised position;

Figure 3 is a top plan view of the machine shown in Figures 1 and 2;

Figure 4 is a perspective, partially diagrammatic view of the drive connections of the various driven portions of the tilling machine;

Figure 5 is a plan view taken substantially on line 5—5 of Figure 1;

Figure 6 is a cross-sectional view taken substantially on line 6—6 of Figure 5;

Figure 7 is a view taken on line 7—7 of Figure 1; and

Figure 8 is a fragmentary cross-section view of the telescopic shafts by means of which power is transmitted.

This soil tilling machine is designed to perform from four to five tillage operations. The machine may be of the self-contained, self-propelled type, or the self-contained pull type, or power take-off pull type. The single machine is designed to transpose a virgin field into a tilled field, thus eliminating the necessity of using a plurality of machines for accomplishing the same ends, as has been the practice heretofore for tillage operations.

The machine of this invention includes a plurality of cutter discs which slice the soil into longitudinal strips of substantially uniform width, to a predetermined depth. Thereafter, the longitudinal strips are severed from the ground at a predetermined depth and revolving angular blades chop the longitudinal strips into segments.

As the machine moves forwardly, the segments of soil are pushed onto a conveyor which elevates the soil segments to a set of rotating angular-set cupped discs which act to turn over the soil segments. The soil segments are then conveyed through a series of counter-rotating straight-set discs which act upon the soil segments to produce a crumbled-soil and shredded-vegetation mixture which is thereafter conveyed through a series of counter-rotating spike harrows that further crumble and mix the soil and vegetation.

After the soil has been acted upon by the crumblers, which includes the discs and harrows, the tilled soil is conveyed to a discharge chute by means of which the tilled soil is deposited substantially at the same spot from which it was removed. There may be attached to the machine thus described, a seeder, a planter, or a fertilizer, or any combination of such attachments, as desired. Another of the important features of this machine is that it is so designed that it may be traveled over a field in such a manner that it never travels on previously tilled soil, thus eliminating packing of the tilled soil, or wheel tracks therein, by the vheicle's wheels.

Referring to the drawings, there is shown in Figure 1 a vehicle generally indicated at 10 having a frame 12, front wheels 16, and rear wheels 18. In the practical embodiment, the frame 12 may be provided with a suitable number of braces to stiffen it, but such details are not shown to avoid undue complexity in the drawings.

The vehicle 10 is provided with a seat 19 for an operator, a steering wheel 20, and a cowling 21 for an internal combustion engine for propulsion of the vehicle. The necessary drive shafts and couplings for transmission of power from the internal combustion engine to the vehicle's driving means are provided but are not shown as the details thereof are well known in the automotive art and do not, per se, form any part of this invention, although the broad fact that the vehicle is self-propelled is of some importance in understanding the operation of a preferred form of this invention.

The vehicle's front wheels 16 are the drive wheels or drive means of the vehicle, and the rear wheels 18 are for steering. The actuation of the rear wheels 18 in the steering operation is controlled by hydraulic means generally indicated at 22, including a hydraulic cylinder 23 and links 24 and 25 connected to the rear wheel axle 18' and actuated by pistons within the cylinder 23.

This tilling machine is directed to performing four basic operations. The first operation includes the cutting and severing of the soil into segments of a predetermined thickness. The second operation includes raising the cut and severed soil and conveying it rearwardly as the vehicle moves forwardly over the ground. The third operation includes turning, crumbling and shredding of the soil segments. And the fourth operation includes discharging of the tilled soil from the tilling machine onto the ground substantially at the same point from which the soil was severed.

To accomplish the first operation of cutting and severing, there is utilized a plurality of vertically disposed, spaced cutting discs 26 rotatably mounted on a horizontal shaft 28 journaled on a subframe generally indicated at 30, which subframe 30 is supported by the vehicle's frame 12. When the subframe 30 is lowered so that the discs 26 engage the ground and upon forward movement of the vehicle 10 over the ground, the discs 26 are operative to cut a width of soil into longitudinal strips substantially parallel to the direction of movement of the vehicle. The longitudinal cuts in the ground made by cutting discs 26 are made to a depth determined by the position of the subframe 30 with respect to the level of the ground.

Positioned rearwardly of said discs 26 is a substantially rigidly mounted cutting or severing blade 32 made of hardened steel or the like. Blade 32 is positioned so that its cutting or severing edge 34, which is also the leading edge, is operative, upon the forward movement of the vehicle, to sever the upper layer of soil from the ground. Thus, blade 32 acts similarly to a plow. The depth of cut made by blade 32 is substantially the same as the depth of cut made by the cutting discs 26. Thus when a layer of top-soil is severed from the ground by means of blade 32, that layer of top-soil has already been cut into longitudinal strips by the previous action of cutting discs 26.

Positioned rearwardly of cutting discs 26 is a cutter reel 36 which is rotatably mounted on the subframe 30. Thus cutter reel 36 has a plurality of elongated angled cutting blades 38 mounted on the periphery of the reel 36 and extending substantially axially of the reel. The reel 36 is mounted for rotation about a horizontally disposed axis. These elongated blades 38 are disposed transversely to the longitudinal strips of soil which are cut by the cutting discs 26. The reel 36 is so positioned with respect to the severing blade 32 that the cutting edges of the angled cutting blades 38 cooperate with portions of severing blade 32 to chop the severed longitudinal strips of soil into relatively short segments.

The severing blade 32 has a relatively long shank portion 40 which slopes upwardly and rearwardly from the severing edge 34. Thus, as the vehicle moves forwardly and the severing blade 32 is operative to sever the top layer of soil from the ground and the cutting discs 26 are operative to divide the width of the severed soil into longitudinal strips, and the cutter reel 36 is operative to chop or sever the longitudinal segments into shorter segments, the continuous operation of the cutting and severing means and forward movement of the vehicle causes the severed and segmented soil to be pushed upwardly and rearwardly over the shank portion 40 of the severing blade 32.

Positioned rearwardly of the rearward end of the shank portion 40 of severing blade 32 is a portion of a continuous conveyor onto which the cut and severed soil segments are forced as they are moved rearwardly of the shank 40 of severing blade 32. The rearward terminal end of shank 40 is concaved and slightly overlies a portion of the conveyor positioned therebehind, as best seen in Figure 6, to provide for efficient transfer of the soil from the severing blade 32 onto the conveyor.

The continuous conveyor includes a continuous, flexible, imperforate conveyor belt 42 made of an appropriate durable material such as a reinforced rubberized fabric, or the like, and is conformed generally to the path of travel as indicated in Figure 1. At one end of its path of travel, the conveyor belt 42 is trained about a roller 44 which is rotatably supported on the subframe 30; and at the other end of its path of travel, the conveyor belt 42 is trained about a roller 46 located near the rearward end of the vehicle. There is an intermediate conveyor drive roller 48 over which conveyor belt 42 is trained, which intermediate roller 48 also serves to substantially divide the conveyor belt 42 into a forward segment and a rearward segment. The forward segment is that portion of the conveyor belt 42 which extends between the rollers 44 and 48; and the rearward portion of the conveyor belt 42 is that portion which extends between rollers 48 and 46. A plurality of additional rollers 50, 52, and 54 are provided for maintaining the conveyor belt 42 in the predetermined path as indicated in Figure 1.

The rollers 44, 46 and 48 over which the conveyor belt 42 is trained extend substantially the entire width of the belt and have longitudinal teeth 56 formed in the periphery thereof for meshing with the teeth 58 formed in the inner periphery of the conveyor belt 42, as seen most clearly in Figure 6. The details of connection between conveyor belt 42 and the rollers over which it is trained are of particular importance in that they provide a convenient manner of transmitting power to the belt.

The forward portion of the conveyor located between rollers 44 and 48 is, in effect, pivotable about the axis of roller 48 as the subframe 30 is lowered or raised. The rotatable roller 44, about which the conveyor belt 42 is trained, is mounted on subframe 30 in a fixedly spaced relation with the severing blade 32 and its shank portion 40. This arrangement provides a substantially continuous, uninterrupted path between the upper surface of the shank 40 of blade 32 and the upper face of the conveyor belt 42, as best seen in Figure 6, so that the cut and severed soil segments may be pushed upwardly over the shank 40 of blade 32 and onto the conveyor belt 42, no matter what the position is of the subframe 30. There is sufficient play or sag in the conveyor belt 42 to accommodate the contemplated range of swinging of the subframe 30.

Returning now to the path over which the cut and severed soil segments are conveyed, after the soil segments pass upwardly over the severing blade 32 and the shank 40 thereof, they are deposited onto the upwardly facing surface of the continuously moving conveyor belt 42 and these soil segments are then conveyed rearwardly of the vehicle. The segments are carried upwardly and rearwardly by the forward segment of the conveyor, and, after passing roller 48, are conveyed rearwardly and slightly downwardly over the rearward segment of the conveyor.

Positioned above the rearward segment of the conveyor, located between rollers 48 and 46, wherein the conveying run of the conveyor belt 42 slopes slightly downwardly, are a plurality of tilling means which may be used singly or in any combination. The first of these tilling means comprises a plurality of spaced, parallel, turning members 60 which are disposed at an angle to the direction of movement of the conveyor belt 42. These turning members 60 are generally cup-shaped discs, the cup-shape being operative to assist in the turning over of the soil segments.

As the turned soil segments are conveyed rearwardly by conveyor belt 42, the soil segments are subjected to one or more sets of a plurality of rotatable shredders. The shredders may be of two types—disc-shaped and harrow type. As best seen in Figure 2, the disc-type shredders comprise two sets, indicated at 62 and 64. The sets of shredders 62 and 64 are substantially uniformly spaced and disposed in vertical planes, and adapted to rotate about horizontal axes. The sets of shredders 62 and 64 are offset from each other so as to provide a large plurality of shredding members which subdivide the soil segments carried by the conveyor belt 42. The sets of shredders 62 and 64 are caused to be counter-rotating to obtain superior results. The turning discs 60 and the shredders, both the disc and harrow type, are all power driven in a manner that will be described hereinafter.

After the segments of soil pass the disc-type shredders 62 and 64, they are carried rearwardly past spiked, harrow-type shredders, which are also disposed in a pair of sets, 66 and 68 with the indivdual harrow members of both sets substantially uniformly spaced and disposed in vertical planes to rotate about horizontal axes. The set of spiked harrow members 64 are offset from the spiked harrow members 68, and the sets of spike-type harrow members are counter-rotating and serve to shred the soil segments into even smaller soil segments.

The action of the turning members 60 and the shredding by discs 62 and 64 and by harrows 66 and 68 is operative to completely crumble and break up the soil in a manner which produces a tilled soil of a highly desirable form. The conveyor belt 42 which conveys the soil being tilled is substantially imperforate thus preventing any loss of soil therethrough. The belt 42 is tough and sturdy and resilient to withstand the shredding operation. The conveyor belt 42 is spaced sufficiently from the shredders to prevent any damage thereto by direct contact with the shredders, and the belt 42 may be supported by idling rollers or by support plates 67 and 69 where needed so as to maintain a close spacing of the belt from the shredders to insure the best shredding and tilling results on the soil carried by the conveyor belt.

After all of the tilling operations above described have been performed, the crumbled soil is discharged from the conveyor by the conveyor belt 42 being carried around roller 46. The discharged crumbled and tilled soil is thus caused to leave the conveyor and drops down onto a sloping chute 70 which extends downwardly from adjacent roller 46 to a point just above the surface of the ground, and the crumbled and tilled soil is deposited onto a swath of ground from which it had been previously cut. The forward speed of the vehicle and the speed of the rearwardly moving conveyor 42 are so coordinated and synchronized that the cut and crumbled soil is deposited onto the ground substantially at the same point from whence the soil was cut.

Referring back to the subframe 30, means are provided for raising and lowering said subframe. These means comprise four hydraulic cylinders 72 which are fixedly mounted on frame 12 of the vehicle by means of straps 74. The extendable pistons 73 of hydraulic cylinders 72 are pivotally connected to flanges 75 on subframe 30. The hydraulic cylinders 72 communicate with a source of fluid (not shown) by means of conduits 76. The hydraulic cylinders 72 are of a type well known in the art and the details thereof are not part of the invention herein. However, the use of hydraulic cylinders for the raising and lowering of subframe 30 is felt to be novel in the broad combination to be claimed hereinafter. By means of an appropriate hydraulic fluid system and control (not shown) the subframe 30 may be selectively raised or lowered to any desired position and be maintained in the selected position. Controls may be provided for actuating the hydraulic cylinders singly or in pairs as desired.

With respect to the means for driving the various rotating parts described hereinabove, there is shown in Figures 1, 2 and 4 shaft 78 which transmits power from an internal combustion engine 80 to a differential 82 which drives wheels 16 through axle 84. A power take-off shaft 86 extends from differential 82 adapted for connection to a transmission 88 mounted on subframe 30. Power is transmitted from shaft 86 to transmission 88 by means of shaft 90 which telescopes with shaft 86. A universal joint 92 is provided between shaft 86 and differential 82; and another universal joint 94 is provided between shaft 90 and transmission 88.

The transmission 88 is operative to drive a power take-off shaft 96, which, in turn, is operative through sprockets 98 and 100 and chain 102 trained over said sprockets to cause cutter reel 36 to be rotated.

There is a second power transmission, generally indicated at 104, mounted on the vehicle frame 12, from which power is taken for driving the shredding discs and harrows and for driving the conveyor. To transmit power to this transmission 104, there is provided a pair of telescopic shafts 106 and 108 extending between transmission 88 and transmission 104, and connected respectively by means of universal joints 110 and 112 to the power take-off and power input connections of said transmissions.

The transmission 104 is operative to transmit power to a pair of shafts 114 and 116 which extend therefrom and which are appropriately journaled on frame 12.

Power is transmitted from shaft 116 to conveyor drive roller 48 by means of sprockets 118 and 120 and chain 122 trained over said sprockets.

Power is transmitted from shaft 114 to the shredding discs and harrows by the following described drive connections. An initial drive connection is made between shaft 114 and a rotatable shaft 124, upon which are mounted one set of shredding discs 62, by means of sprockets 126 and 128 and chain 130 trained over said sprockets. Another sprocket 132 on shaft 124 serves to drive a reversing chain 134 trained over sprockets 136 and 138 respectively mounted on shaft 140 and 142. Shaft 140 has mounted thereon the other set of shredding discs 64. By the above described arrangement the sets of shredding discs 62 and 64 are caused to rotate in opposite directions. Shaft 142 carries thereon the turning disc 60.

The sets of shredding harrows 66 and 68 are mounted on spaced shafts 144 and 146 and these latter shafts are caused to rotate respectively in the same direction with shafts 124 and 140. The shafts 124 and 144 are drivingly connected by means of sprockets 148 and 150 and chain 152 trained thereover; and the shafts 140 and 146 are drivingly connected by means of sprockets 154 and 156 and chain 158 trained thereover.

The shafts 114, 116, 124, 140, 142, 144 and 146 are all appropriately journaled in structure supported by the vehicle frame 12.

If desired, the tilling machine may have secured to the rearward end thereof an agricultural dispensing attachment, such as a fertilizer or seeder, generally shown at 160. The attachment 160 may be appropriately secured to the frame 12 by members 162 and 164. The dispensing attachment may be of the power driven type and a simple power take off may be provided, as shown in Figure 4, consisting of sprocket 166 rotatable with conveyor roller 46, sprocket 168 for driving the dispensing attachment's drive shaft 170, and a chain 172 trained over sprockets 166 and 168.

The portion of the tilling machine which carries the greater portion of conveyor 42 and which carries turning discs 60, shredder discs 62 and 64, and shredder harrows 66 and 68, may be substantially fully enclosed by a sheet metal housing or cowling, generally indicated at 174. The housing 174 provides, in effect, an enclosure which limits possible loss of soil during the tilling operations such as may occur with dry soil that produces large amounts of dust.

It will further be seen in Figure 3 that both the front and rear right-hand wheels are located inwardly of the greatest lateral extent of the vehicle and inwardly of the greatest lateral extent of the cutting and severing means carried by subframe 30. This arrangement permits the tilling of an area in adjacent strips without having the vehicle wheels pass over any portion of the ground that had previously been tilled, and thus prevents packing of the tilled soil. Although only one of the front wheels is shown located within the lateral confines of the vehicle, it is intended that the teachings in this specification cover the location of both front wheels within the lateral confines of the vehicle, although it is only necessary that the wheels on at least one side of the vehicle be located inwardly of the lateral extent of the soil cutting and severing means to accomplish the ends set forth above.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. A soil tilling machine comprising, in combination, a vehicle having means for movement over ground to be tilled, means operative upon forward movement of said vehicle for cutting a layer of soil of a selected thickness into longitudinal strips, severing means operative upon forward movement of said vehicle for severing said layer of soil from the ground, means for cutting the severed longitudinal strips of soil into segments, said plurality of means for severing and cutting the layer of soil being mounted on a subframe which is carried by said vehicle, means including said severing means for lifting the severed and cut layer of soil off the ground, conveyor means carried by said vehicle for conveying the layer of soil toward the rear of the vehicle, means carried by said vehicle for performing tilling operations on the cut and severed layer of soil as it is carried by said conveyor, means for discharging the tilled soil from the vehicle, some of said cutting means being power driven, some of said tilling means being power driven, a single source of power carried by the vehicle, a first power transmission for said power driven cutting means carried by said subframe, telescopic drive shafts connecting said first transmission with said source of power, a second power transmission for said power driven tilting means, telescopic drive shafts connecting said first transmission with said second transmission, and power transmission means interconnecting one of said transmissions with said conveyor to drive said conveyor.

2. A soil tilling machine comprising, in combination, a vehicle with means for movement over ground to be tilled, means carried by said vehicle and operative upon forward movement of said vehicle for cutting a layer of soil into longitudinal strips, means carried by said vehicle and operative upon forward movement of said vehicle for severing said layer of soil from the ground, means carried by said vehicle for cutting said longitudinal strips into segments, means including said severing means for lifting the severed and cut soil off the ground, conveyor means including an imperforate conveyor belt carried by said vehicle for conveying the layer of soil in a direction toward the rear of the vehicle, tilling means carried by said vehicle and positioned above a portion of the imperforate conveyor belt which carries the severed layer of soil for performing tilling operations on said layer of soil, said tilling means comprising a plurality of spaced parallel turning members disposed at an angle to the direction of movement of the conveyor, said members being operative to engage the soil segments to perform a tilling operation thereon as the segments are carried past said members by said conveyor, and a plurality of rotatably mounted shredders positioned rearwardly of said turning members.

3. A soil tilling machine comprising, in combination, a vehicle with means for movement over ground to be tilled, means carried by said vehicle and operative upon forward movement of said vehicle for cutting a layer of soil into longitudinal strips, means carried by said vehicle and operative upon forward movement of said vehicle for severing said layer of soil from the ground, means carried by said vehicle for cutting said longitudinal strips into segments, means including said severing means for lifting the severed and cut soil off the ground, conveyor means including an imperforate conveyor belt carried by said vehicle for conveying the layer of soil in a direction toward the rear of the vehicle, tilling means carried by said vehicle and positioned above a portion of the imperforate conveyor belt which carries the severed layer of soil for performing tilling operations on said layer of soil, said tilling means comprising a plurality of spaced cupped discs disposed at an angle to the direction of movement of the conveyor, said cupped discs being operative to engage the soil segments to perform a tilling operation thereon as the soil segments are carried past said discs by said conveyor, a plurality of rotatably mounted shredders positioned rearwardly of said cupped discs, said plurality being divided into sets which are mounted to rotate on at least one pair of axes lying transverse to the direction of movement of the conveyor, and means for rotating a pair of adjacent sets of shredders in opposite directions about their axes.

4. A soil tilling machine comprising, in combination, a vehicle with means for movement over ground to be tilled, means carried by said vehicle and operative upon forward movement of said vehicle for cutting a layer of soil into longitudinal strips, means carried by said vehicle and operative upon forward movement of said vehicle for severing said layer of soil from the ground, means carried by said vehicle for cutting said longitudinal strips into segments, means including said severing means for lifting the severed and cut soil off the ground, conveyor means including an imperforate conveyor belt carried by said vehicle for conveying the layer of soil in a direction toward the rear of the vehicle, tilling means carried by said vehicle and positioned above a portion of the imperforate conveyor belt which carries the severed layer of soil for performing tilling operations on said layer of soil, said tilling means comprising a plurality of spaced cupped discs disposed at an angle to the direction of movement of the conveyor, said cupped discs being operative to engage the soil segments to perform a tilling operation thereon as the soil segments are carried past said discs by said conveyor, a plurality of rotatably mounted disc-type shredders and a plurality of rotatably mounted spike-type shredders positioned rearwardly of said cupped discs, and means for rotating said shredders.

5. A soil tilling machine comprising, in combination, a vehicle with means for movement over ground to be tilled, means carried by said vehicle and operative upon forward movement of said vehicle for cutting a layer of soil into longitudinal strips, means carried by said vehicle and operative upon forward movement of said vehicle for severing said layer of soil from the ground, means carried by said vehicle for cutting said longitudinal strips into segments, means including said severing means for lifting the severed and cut soil off the ground, conveyor means including an imperforate conveyor belt carried by said vehicle for conveying the layer of soil in a direction toward the rear of the vehicle, tilling means carried by said vehicle and positioned above a portion of the imperforate conveyor belt which carries the severed layer of soil for performing tilling operations on said layer of soil, said tilling means comprising a plurality of spaced cupped discs disposed at an angle to the direction of movement of the conveyor, said cupped discs being operative to engage the soil segments to perform a tilling operation thereon as the soil segments are carried past said discs by said conveyor, a plurality of rotatably mounted disc-type shredders and a plurality of rotatably mounted spike-type shredders positioned rearwardly of said cupped discs, each type of shredders being divided into a pair of sets which are mounted to rotate on axes lying transverse to the direction of movement of the conveyor, and means for rotating each pair of adjacent sets of shredders in opposite directions about their axes.

6. A soil tilling machine comprising, in combination, a vehicle with means for movement over ground to be tilled, means carried by said vehicle and operative upon forward movement of said vehicle for cutting a layer of soil into longitudinal strips, means carried by said vehicle and operative upon forward movement of said vehicle for severing said layer of soil from the ground, means carried by said vehicle for cutting said longitudinal strips into segments, means including said severing means for lifting the severed and cut soil off the ground, conveyor means including an imperforate conveyor belt carried by said vehicle for conveying the layer of soil in a direction toward the rear of the vehicle, tilling means carried by said vehicle and positioned above a portion of the imperforate conveyor belt which carries the severed layer of soil for performing tilling operations on said layer of soil, said tilling means comprising a plurality of spaced, parallel turning members positioned above the conveyor and disposed at an angle to the direction of movement of the conveyor, said turning members being operative to engage the soil segments to perform a tilling operation thereon as the soil segments are carried past said turning members by said conveyor, a plurality of rotatably mounted shredders positioned rearwardly of said turning members, said plurality of shredders being divided into sets which are mounted to rotate on at least one pair of axes lying transverse to the direction of movement of the conveyor, the shredders constituting each set having a substantially uniform spacing therebetween, and the individual shredders of adjacent sets of shredders being offset laterally from each other.

7. A soil tilling machine comprising, in combination, a vehicle with means for movement over ground to be tilled, means carried by said vehicle and operative upon forward movement of said vehicle for cutting a layer of soil into longitudinal strips, means carried by said vehicle and operative upon forward movement of said vehicle for severing said layer of soil from the ground, means carried by said vehicle for cutting said longitudinal strips into segments, means including said severing means for lifting the severed and cut soil off the ground, conveyor means including an imperforate conveyor belt carried by said vehicle for conveying the layer of soil in a direction toward the rear of the vehicle, tilling means carried by said vehicle and positioned above a portion of the imperforate conveyor belt which carries the severed layer of soil for performing tilling operations on said layer of soil, said tilling means comprising a plurality of spaced, parallel turning members positioned above the conveyor and disposed at an angle to the direction of movement of the conveyor, said turning members being operative to engage the soil segments to perform a tilling operation thereon as the soil segments are carried past said turning members by said conveyor, a plurality of rotatably mounted shredders positioned rearwardly of said turning members, said plurality of shredders being divided into a pair of sets which are mounted to rotate on a pair of axes lying transverse to the direction of movement of the conveyor, the shredders constituting each set having a uniform spacing therebetween, the individual shredders of one set of shredders being disposed substantially midway between the shredders of the other set of shredders, and means for rotating adjacent sets of shredders in opposite directions about their axes.

References Cited in the file of this patent

UNITED STATES PATENTS

| | | |
|---|---|---|
| 41,371 | Foley | Jan. 26, 1864 |
| 1,262,563 | Reilly | Apr. 9, 1918 |
| 1,395,637 | Graves | Nov. 1, 1921 |
| 1,546,818 | Addler | July 21, 1925 |
| 1,634,172 | Carrick | June 28, 1927 |
| 2,060,688 | Pryor et al. | Nov. 10, 1936 |
| 2,401,653 | Mohler | June 4, 1946 |
| 2,524,871 | Andrus | Oct. 10, 1950 |
| 2,630,051 | Palmer | Mar. 3, 1953 |

FOREIGN PATENTS

| | | |
|---|---|---|
| 1,310 | Great Britain | of 1856 |
| 197,291 | Great Britain | Feb. 28, 1924 |